US012394858B2

(12) United States Patent
Kim et al.

(10) Patent No.: US 12,394,858 B2
(45) Date of Patent: Aug. 19, 2025

(54) BATTERY RACK AND ENERGY STORAGE SYSTEM INCLUDING THE SAME

(71) Applicant: LG Energy Solution, Ltd., Seoul (KR)

(72) Inventors: Dong-Hyun Kim, Daejeon (KR); Kyung-Min Lee, Daejeon (KR); Seung-Jun Lee, Daejeon (KR); Goan-Su Jung, Daejeon (KR); Kown Son, Daejeon (KR); Hee-Chan Kim, Daejeon (KR); Jong-Soo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 696 days.

(21) Appl. No.: 17/424,404

(22) PCT Filed: Sep. 3, 2020

(86) PCT No.: PCT/KR2020/011889
§ 371 (c)(1),
(2) Date: Jul. 20, 2021

(87) PCT Pub. No.: WO2021/049820
PCT Pub. Date: Mar. 18, 2021

(65) Prior Publication Data
US 2022/0094011 A1 Mar. 24, 2022

(30) Foreign Application Priority Data
Sep. 9, 2019 (KR) .................. 10-2019-0111599

(51) Int. Cl.
*H01M 50/296* (2021.01)
*H01M 10/42* (2006.01)
(Continued)

(52) U.S. Cl.
CPC ....... *H01M 50/296* (2021.01); *H01M 10/425* (2013.01); *H01M 10/441* (2013.01);
(Continued)

(58) Field of Classification Search
CPC ............ H01M 50/296; H01M 10/613; H01M 10/6563; H01M 50/209; H01M 10/425;
(Continued)

(56) References Cited

U.S. PATENT DOCUMENTS 5,140,744 A * 8/1992 Miller .................... A47B 87/00
429/96
2002/0192543 A1 12/2002 Heimer
(Continued)

FOREIGN PATENT DOCUMENTS

CN 103605389 A 2/2014
CN 103098294 B * 6/2015 ............ G01R 19/00
(Continued)

OTHER PUBLICATIONS

English Machine Translation of CN 103098294 B (Year: 2015).*
(Continued)

*Primary Examiner* — Matthew T Martin
*Assistant Examiner* — Katherine N Higgins
(74) *Attorney, Agent, or Firm* — Birch, Stewart, Kolasch & Birch, LLP

(57) ABSTRACT

A battery rack includes a rack case, and a first battery module assembly and a second battery module assembly respectively including a plurality of battery modules stacked along an upper and lower direction of the rack case, and, inside the rack case, the plurality of battery modules of the second battery module assembly are arranged such that upper and lower portions thereof are inverted based on the arrangement of the plurality of battery modules of the first battery module assembly.

16 Claims, 10 Drawing Sheets

(51) Int. Cl.
*H01M 10/44* (2006.01)
*H01M 10/613* (2014.01)
*H01M 10/6563* (2014.01)
*H01M 50/209* (2021.01)

(52) U.S. Cl.
CPC ..... *H01M 10/613* (2015.04); *H01M 10/6563* (2015.04); *H01M 50/209* (2021.01); *H01M 2010/4271* (2013.01); *H01M 2220/20* (2013.01)

(58) Field of Classification Search
CPC ....... H01M 10/441; H01M 2010/4271; H01M 2220/20
See application file for complete search history.

(56) References Cited

U.S. PATENT DOCUMENTS

| | | | |
|---|---|---|---|
| 2012/0091965 A1 | 4/2012 | Seo et al. | |
| 2013/0108905 A1 | 5/2013 | Murakami et al. | |
| 2013/0235499 A1 | 9/2013 | Kang et al. | |
| 2014/0134460 A1 | 5/2014 | Youn | |
| 2015/0382496 A1* | 12/2015 | Burant, Jr. | H01M 10/0445 361/624 |
| 2016/0056428 A1 | 2/2016 | Kim | |
| 2017/0214014 A1* | 7/2017 | Yoon | H01M 50/209 |
| 2017/0309979 A1 | 10/2017 | Lee et al. | |
| 2018/0109016 A1* | 4/2018 | Fees | H01R 11/281 |
| 2018/0123159 A1 | 5/2018 | Kim | |
| 2019/0103639 A1* | 4/2019 | Guglielmo | H01M 10/482 |
| 2019/0140229 A1* | 5/2019 | Lindstrom | H01M 10/613 |
| 2019/0181406 A1* | 6/2019 | Sugeno | H01M 50/298 |
| 2019/0348646 A1* | 11/2019 | Rangwala | H01M 50/524 |
| 2019/0372068 A1 | 12/2019 | Naito et al. | |
| 2020/0006722 A1* | 1/2020 | Tanner | H01M 10/6556 |
| 2022/0052411 A1* | 2/2022 | Liposky | H01M 50/505 |

FOREIGN PATENT DOCUMENTS

| | | |
|---|---|---|
| EP | 2 715 836 B1 | 4/2015 |
| JP | 2007-073222 A | 3/2007 |
| JP | 2013-097926 A | 5/2013 |
| JP | 2014-232566 A | 12/2014 |
| JP | 2015-115150 A | 6/2015 |
| JP | 2017-059376 A | 3/2017 |
| JP | 2018-26255 A | 2/2018 |
| JP | 2019-516229 A | 6/2019 |
| JP | 2019-149342 A | 9/2019 |
| KR | 10-2012-0038266 A | 4/2012 |
| KR | 10-1367755 B1 | 2/2014 |
| KR | 10-2014-0061212 A | 5/2014 |
| KR | 10-2016-0024304 A | 3/2016 |
| KR | 10-2017-0089247 A | 8/2017 |
| KR | 10-1782984 B1 | 9/2017 |
| KR | 10-2018-0048030 A | 5/2018 |
| WO | WO 2018/123577 A1 | 7/2018 |

OTHER PUBLICATIONS

International Search Report for PCT/KR2020/011889 mailed on Dec. 18, 2020.

Extended European Search Report for European Application No. 20863209.1, dated May 2, 2022.

* cited by examiner

BATTERY RACK AND ENERGY STORAGE SYSTEM INCLUDING THE SAME

TECHNICAL FIELD

The present disclosure relates to a battery rack and an energy storage system including the battery rack.

The present application claims priority to Korean Patent Application No. 10-2019-0111599 filed on Sep. 9, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery rack by using at least one battery module and adding other components. Here, according to various voltage and capacity requirements, an energy storage system may be configured to include at least one battery rack that includes at least one battery module.

The conventional battery rack is configured to include a plurality of battery modules and a rack case for accommodating the plurality of battery modules. Here, the plurality of battery modules are generally arranged to be vertically stacked in a line inside the rack case along an upper and lower direction of the rack case, and are electrically connected to each other via a bus bar unit that connects terminals of the battery modules inside the rack case for electrical connection with each other.

Meanwhile, recently, the capacity increase of the battery rack is accelerating according to the request of customers. Accordingly, when the plurality of battery modules are vertically stacked in the rack case, the need for a two-row vertical stacking structure is increasing instead of a one-row structure.

However, in the case of the plurality of battery modules having a two-row vertical stacking structure, it is not easy to connect the terminals of the battery modules. Conventionally, in the two-row vertical stacking structure, for electrical connection between a terminal of one battery module and a terminal of another battery module, a bus bar unit having a very long length and bent multiple times or extended diagonally is needed. Accordingly, due to the bus bar unit, the overall electrical connection of the battery modules has a complicated shape, which is disadvantageous in terms of space utilization. In addition, the bus bar unit causes the increase of manufacturing costs and increases the overall assembly process time.

Therefore, it is needed to find a way for providing a battery rack capable of efficiently connecting terminals of battery modules and reducing manufacturing cost, and an energy storage system including the battery rack.

DISCLOSURE

Technical Problem

The present disclosure is directed to providing a battery rack capable of efficiently connecting terminals of battery modules, and an energy storage system including the battery rack.

In addition, the present disclosure is also directed to providing a battery rack capable of reducing manufacturing costs and improving assembly process efficiency, and an energy storage system including the battery rack.

Technical Solution

In one aspect of the present disclosure, there is provided a battery rack, comprising:

a rack case having a predetermined accommodation space;

a plurality of battery modules including a first plurality of battery modules and a second plurality of battery modules, each of the plurality of battery modules having a positive electrode terminal at a first end and a negative electrode terminal at a second end;

a first battery module assembly disposed inside the rack case and including the first plurality of battery modules stacked along an upper and lower direction of the rack case, the positive electrode terminal being above the negative electrode terminal; and a second battery module assembly disposed to be spaced apart from the first battery module assembly by a predetermined distance and including the second plurality of battery modules stacked along the upper and lower direction of the rack case, wherein, inside the rack case, the second plurality of battery modules of the second battery module assembly are inverted based on the arrangement of the first plurality of battery modules of the first battery module assembly to have the negative electrode terminal being above the positive electrode terminal.

The battery rack may further comprise a bus bar unit configured to electrically connect the first plurality of battery modules of the first battery module assembly and the second plurality of battery modules of the second battery module assembly.

Each component of the bus bar unit may be provided to have a straight bar shape.

The bus bar unit may include a plurality of first bus bar members configured to connect the first plurality of battery modules of the first battery module assembly to each other; a plurality of second bus bar members configured to connect the second plurality of battery modules of the second battery module assembly to each other; and a connection bus bar member configured to connect the first battery module assembly and the second battery module assembly to each other.

The connection bus bar member may be configured to connect a battery module at a bottom end of the first battery module assembly and a battery module at a bottom end of the second battery module assembly to each other.

The connection bus bar member may be provided to have a straight bar shape and configured to connect the battery module at the bottom end of the first battery module assembly and the battery module at the bottom end of the second battery module assembly to each other in a horizontal direction of the rack case.

Each of the plurality of battery modules may include at least one battery cell; and_a module case configured to accommodate the at least one battery wherein the positive electrode terminal and the negative electrode terminal are provided at one side of the module case and electrically connected to the at least one battery cell.

The positive electrode terminal and the negative electrode terminal of each of the plurality of battery modules may be arranged in an upper and lower direction at one end of the module case.

Each of the plurality of battery modules may further include an identifying member provided to the module case and configured to determine whether each of the plurality of battery modules are arranged in a forward direction or a rearward direction based on the upper and lower direction of the rack case.

In addition, each of the plurality of battery modules may include at least two cell assemblies having a plurality of battery cells; and a battery management system configured to control charging and discharging of the plurality of battery cells.

Further, the battery rack may include a central control unit configured to receive state information of the plurality of battery modules from the battery management system provided to each of the plurality of battery modules and control charging and discharging of the plurality of battery modules.

Also, the battery rack may further include:

a cooling fan provided to each of the plurality of battery modules and configured to put an external air into each of the plurality of battery modules; and a fan power cable configured to supply power to operate the cooling fan.

Moreover, the fan power cable may include:

a power source electrically connected to the central control unit to supply power to the cooling fan; and a connector unit configured to branch in left and right directions toward each of the plurality of battery modules and connected to an external power terminal of the cooling fan.

In addition, the connector unit of the fan power cable may include:

a first connector portion configured to branch to each of the first plurality of battery modules of the first battery module assembly; and a second connector portion configured to branch to each of the second plurality of battery modules of the second battery module assembly.

Further, the battery rack may further comprise a communication cable configured to provide and receive a communication signal between the central control unit and the battery management system provided to each of the plurality of battery modules.

Also, the communication cable may include:

a connection portion configured to extend along the first plurality of battery modules of the first battery module assembly or the second plurality of battery modules of the second battery module assembly and connected to the battery management system provided to each of the plurality of battery modules; and an extension portion configured to extend to connect the battery management systems respectively provided to the first battery module assembly and the second battery module assembly to each other, wherein the extension portion may be configured to extend from a battery module at a bottom end of the first battery module assembly to a battery module at a bottom end of the second battery module assembly.

Moreover, the present disclosure also provides an energy storage system, comprising at least one battery rack according to the above embodiments.

Advantageous Effects

According to various embodiments as described above, it is possible to provide a battery rack capable of efficiently connecting terminals of battery modules, and an energy storage system including the battery rack.

In addition, according to various embodiments as described above, it is possible to provide a battery rack capable of reducing manufacturing costs and improving assembly process efficiency, and an energy storage system including the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
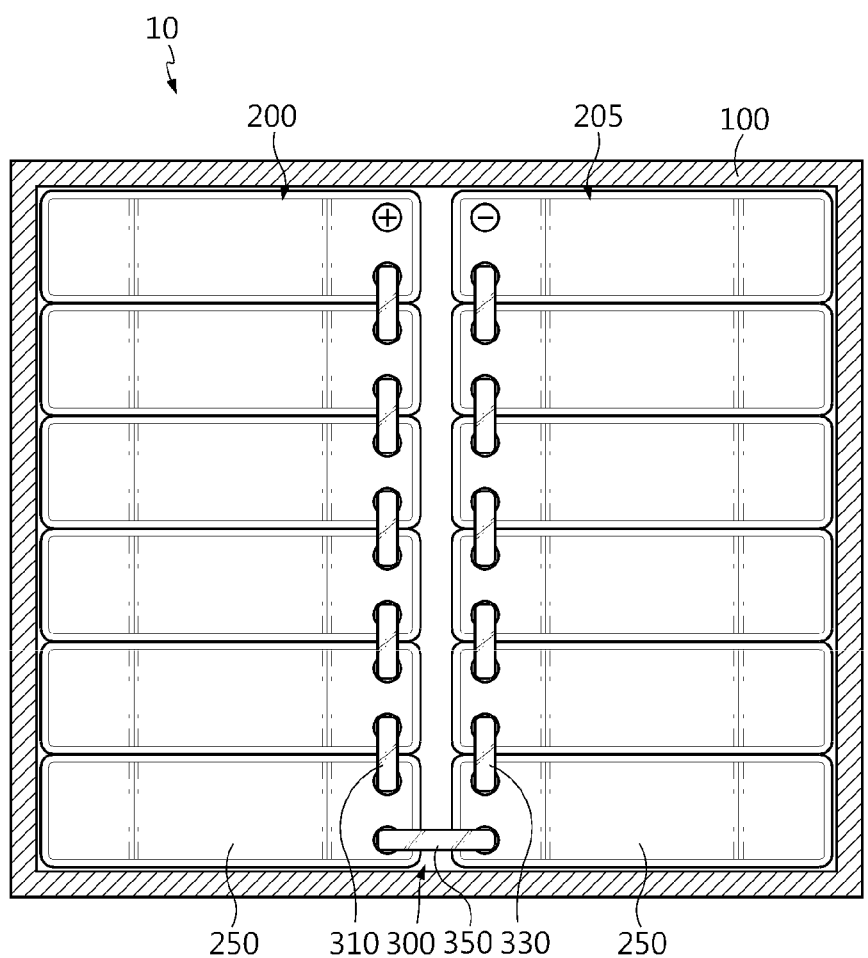
FIG. 1 is a diagram for illustrating a battery rack according to an embodiment of the present disclosure.
Figure 2:
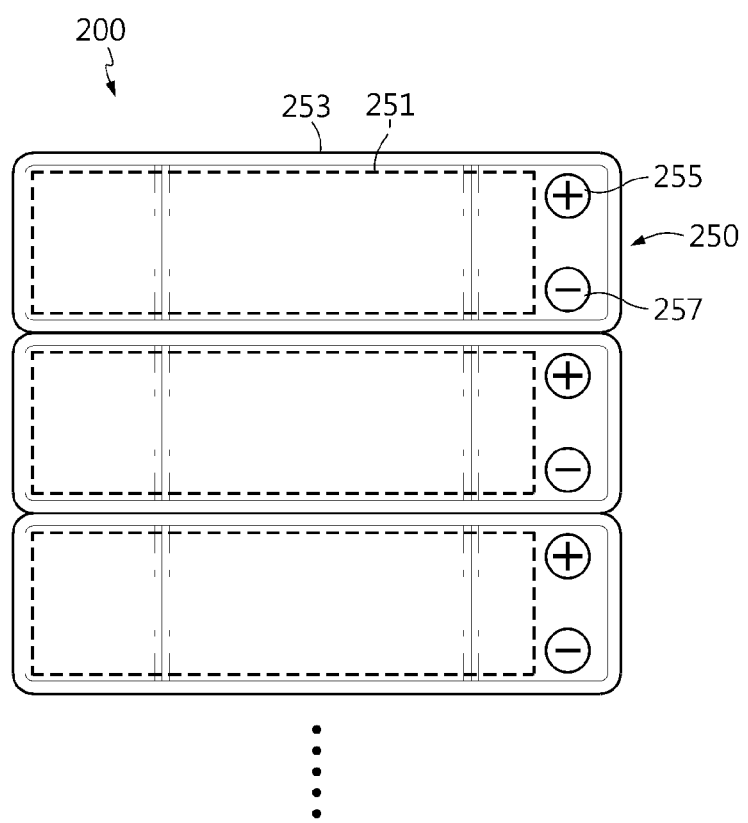
FIG. 2 is a diagram for illustrating a battery module of a first battery module assembly, provided to the battery rack of FIG. 1.
Figure 3:
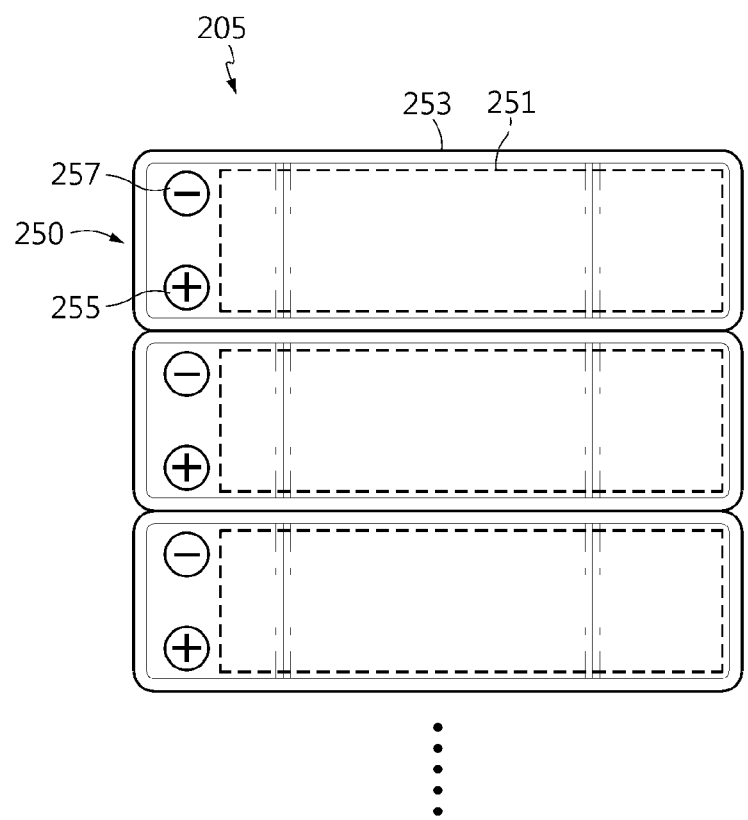
FIG. 3 is a diagram for illustrating a battery module of a second battery module assembly, provided to the battery rack of FIG. 1.

FIG. 1 is a diagram for illustrating a battery rack according to an embodiment of the present disclosure, FIG. 2 is a diagram for illustrating a battery module of a first battery module assembly, provided to the battery rack of FIG. 1, and FIG. 3 is a diagram for illustrating a battery module of a second battery module assembly, provided to the battery rack of FIG. 1.

Referring to FIGS. 1 to 3, a battery rack 10 may include a rack case 100, a first battery module assembly 200, a second battery module assembly 205, and a bus bar unit 300.

The rack case 100 is configured to accommodate the first battery module assembly 200 and the second battery module assembly 205, explained later, and may have a predetermined accommodation space for this purpose.

The first battery module assembly 200 is disposed inside the rack case 100, and may include a plurality of battery modules 250.

The plurality of battery modules 250 may be vertically stacked inside the rack case 100 along an upper and lower direction of the rack case 100. Each of the battery modules 250 may include a battery cell 251, a module case 253, a positive electrode terminal 255, and a negative electrode terminal 257.

The battery cell 251 is a secondary battery and may be provided as a pouch-type secondary battery, a rectangular secondary battery, or a cylindrical secondary battery. Hereinafter, in this embodiment, it will be described that the battery cell 251 is a pouch-type secondary battery.

At least one battery cell 251 or a plurality of battery cells 251 may be provided. Hereinafter, in this embodiment, it will be described that the battery cell 251 is provided in plural.

The module case 253 may accommodate the at least one battery cell 251 or the plurality of battery cells 251. To this end, the accommodation space for accommodating the battery cell 251 may be provided in the module case 253.

The positive electrode terminal 255 is electrically connected to the at least one battery cell 251 or the plurality of battery cells 251 and may be provided at one side of the module case 253. Specifically, the positive electrode terminal 255 may be disposed at the front of one end of the module case 253.

The negative electrode terminal 257 is electrically connected to the at least one battery cell 251 or the plurality of battery cells 251 and may be provided at one side of the module case 253. Specifically, the negative electrode terminal 257 may be disposed at the front of one end of the module case 253 and may be arranged in an upper and lower direction with respect to the positive electrode terminal 255 at one end of the module case 253.

In this embodiment, in each of the battery modules 250 of the first battery module assembly 200, in the upper and lower direction of the rack case 100, the positive electrode terminal 255 may be disposed above the negative electrode terminal 257.

The second battery module assembly 205 may be disposed to be spaced apart from the first battery module assembly 200 by a predetermined distance in a horizontal direction. The second battery module assembly 205 may include a plurality of battery modules 250 vertically stacked along the upper and lower direction of the rack case 100.

The second battery module assembly 205 and the first battery module assembly 200 may form a two-row vertical stacking structure inside the rack case 100. Accordingly, the battery rack 10 according to this embodiment may implement a large-capacity battery rack 10 with a higher energy density.

The plurality of battery modules 250 of the second battery module assembly 205 may also include a battery cell 251, a module case 253, a positive electrode terminal 255, and a negative electrode terminal 257.

In the rack case 100, the plurality of battery modules 250 of the second battery module assembly 205 are arranged such that upper and lower portions thereof are inverted based on the arrangement of the plurality of battery modules 250 of the first battery module assembly 200.

Accordingly, in the plurality of battery modules 250 of the second battery module assembly 205, in the upper and lower direction of the rack case 100, the positive electrode terminal 255 may be disposed under the negative electrode terminal 257. Conversely, in the plurality of battery modules 250 of the first battery module assembly 200, in the upper and lower direction of the rack case 100, the positive electrode terminal 255 may be disposed above the negative electrode terminal 257.

That is, the plurality of battery modules 250 of the first battery module assembly 200 may be arranged in a forward direction based on the upper and lower direction of the rack case 100, and the plurality of battery modules 250 of the second battery module assembly 205 may be arranged in a rearward direction based on the upper and lower direction of the rack case 100. Here, the forward direction may refer to a direction in which the positive electrode terminal 255 is disposed above the negative electrode terminal 257 based on the upper and lower direction of the rack case 100, and the rearward direction may refer to a direction in which the positive electrode terminal 255 is disposed below the negative electrode terminal 257 based on the upper and lower direction of the rack case 100.

According to this arrangement, the positive electrode terminal 255 and the negative electrode terminal 257 of the plurality of battery modules 250 of the second battery module assembly 205 disposed at the right of the first battery module assembly 200 may be disposed at the front of the left end of the module case 253, and the positive electrode terminal 255 and the negative electrode terminal 257 of the plurality of battery modules 250 of the first battery module assembly 200 may be disposed at the front of the right end of the module case 253, so that their terminals 255, 257 are placed closer to each other.

The bus bar unit 300 may electrically connect the plurality of battery modules 250 of the first battery module assembly 200 and the plurality of battery modules 250 of the second battery module assembly 205.

The bus bar unit 300 may include a first bus bar member 310, a second bus bar member 330, and a connection bus bar member 350.

The first bus bar member 310 is provided to have a straight bar shape elongated in one direction and may be provided in plural. The plurality of first bus bar members 310 may connect the plurality of battery modules 250 of the first battery module assembly 200 to each other.

The second bus bar member 330 is provided to have a straight bar shape elongated in one direction and may be provided in plural, like the first bus bar member 310. The plurality of second bus bar members 330 may connect the plurality of battery modules 250 of the second battery module assembly 205 to each other.

The connection bus bar member 350 may be provided to have a straight bar shape elongated in one direction, like the first bus bar member 310 and the second bus bar member 330. That is, in this embodiment, all the first bus bar member 310, the second bus bar member 330 and the connection bus bar member 350 may be provided in a straight bar shape. After all, in this embodiment, the bus bar units 300 may be provided to have the same straight bar shape. In other words, the bus bar units may have a simple shape, rather than a complicatedly bent shape.

The connection bus bar member 350 may connect the first battery module assembly 200 and the second battery module assembly 205 to each other. Specifically, the connection bus bar member 350 may connect a battery module 250 at a bottom end of the first battery module assembly 200 and a battery module 250 at a bottom end of the second battery module assembly 205 to each other. More specifically, the connection bus bar member 350 may connect the negative electrode terminal 257 of the battery module 250 at the bottom end of the first battery module assembly 200 and the positive electrode terminal 255 of the battery module 250 at the bottom end of the second battery module assembly 205 to each other in a horizontal direction of the rack case 100.

At this time, the positive electrode terminal 255 and the negative electrode terminal 257 are formed at the front of the right end of the battery module 250 of the first battery module assembly 200, and the negative electrode terminal 257 and the positive electrode terminal 255 are formed at the front of the left end of the battery module 250 of the second battery module assembly 205. Accordingly, the negative electrode terminal 257 of the battery module 250 of the first battery module assembly 200 may be located close to the positive electrode terminal 255 of the battery module 250 of the second battery module assembly 205.

Therefore, according to this configuration of the present disclosure, since the plurality of battery modules of the second battery module assembly are arranged inside the rack case such that their upper and lower portions are inverted based on the arrangement of the plurality of battery modules of the first battery module assembly, the length of the connection bus bar member 350 for connecting the first battery module assembly 200 and the second battery module assembly 205 to each other may be minimized.

That is, in the prior art, if the first battery module assembly and the first battery module assembly arranged in the left and right direction inside the rack case are arranged in the same pattern, their electrode terminals are formed at one sides of the battery modules and thus far away from each other, so the conventional connection bus bar member needs to be formed as long as the left and right length of the battery module. Moreover, the connection bus bar member of the elongated structure not only increases material cost, but also blocks the front of the battery module after installation, which makes a worker using the battery module uncomfortable. Therefore, the battery rack of the present disclosure may greatly reduce the length of the connection bus bar member, thereby reducing the manufacturing cost of the battery rack and greatly increasing the convenience of use.

Hereinafter, the assembly process of the battery rack 10 according to this embodiment will be described in more detail.

FIGS. 4 to 8 are diagrams for illustrating a process of assembling the battery rack of FIG. 1.

Figure 4:
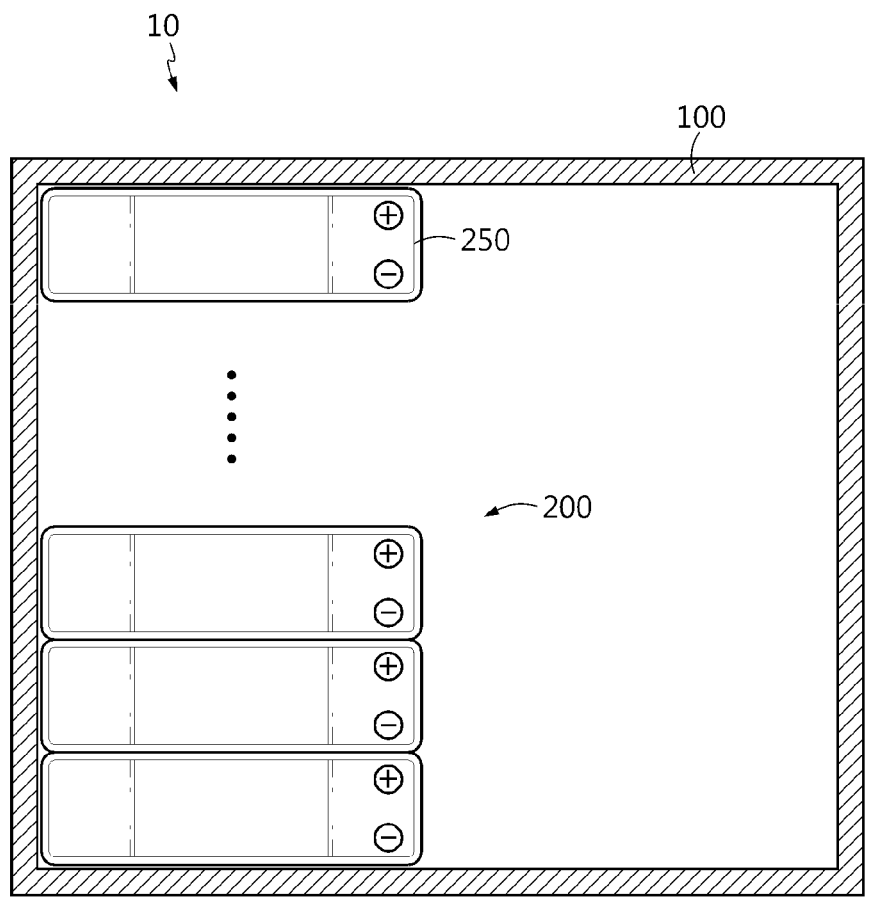
FIGS. 4 to 8 are diagrams for illustrating a process of assembling the battery rack of FIG. 1.

Referring to FIG. 4, in the assembly process of the battery rack 10, a manufacturer or the like may vertically stack the battery modules 250 of the first battery module assembly 200 in the rack case 100. Here, the battery modules 250 of the first battery module assembly 200 may be arranged in a forward direction based on the upper and lower direction of the rack case 100.

Figure 5:
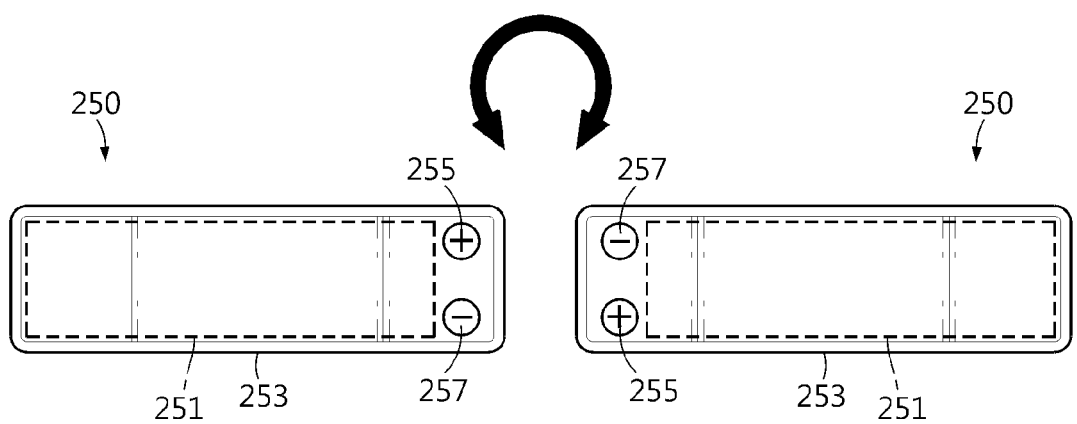
Figure 6:
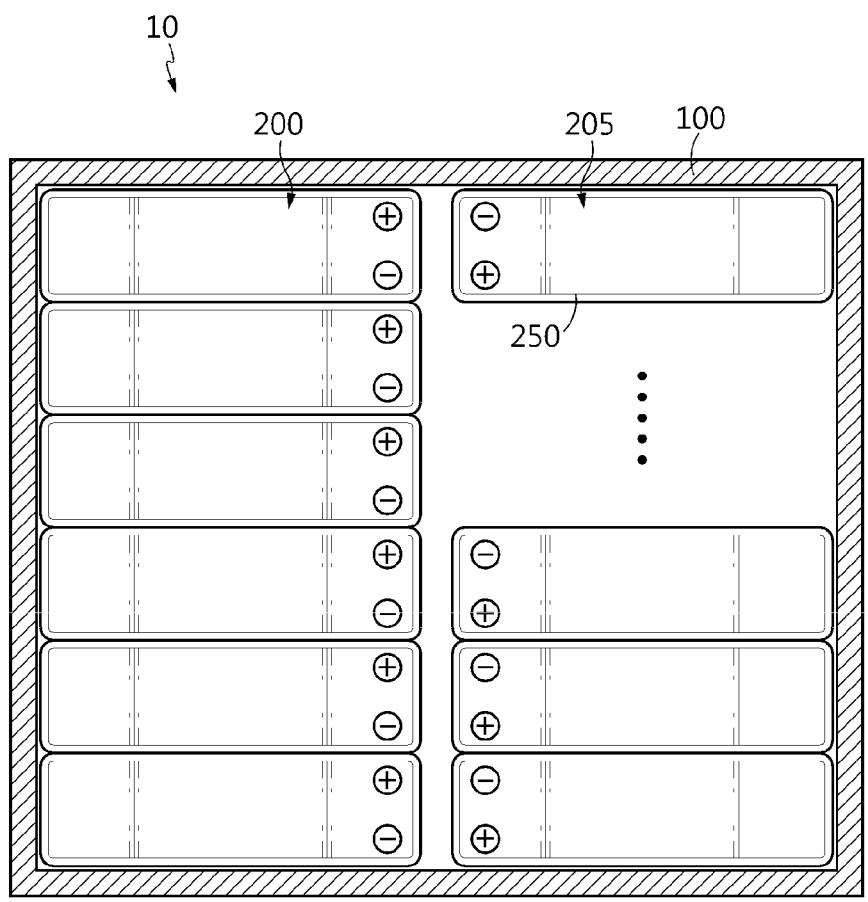

Referring to FIGS. 5 and 6, the manufacturer or the like may vertically stack the battery modules 250 of the second battery module assembly 205 in the rack case 100. Here, before stacking the battery modules 250 of the second battery module assembly 205, the manufacturer or the like may invert the battery modules 250 into a rearward direction first. That is, the manufacturer or the like may arrange the battery modules 250 of the second battery module assembly 205 in the rearward direction and then vertically stack the battery modules 250 inside the rack case 100.

As the vertical stacking of the second battery module assembly 205, the first battery module assembly 200 and the second battery module assembly 205 may be arranged in a two-row vertical stacking structure inside the rack case 100.

Figure 7:
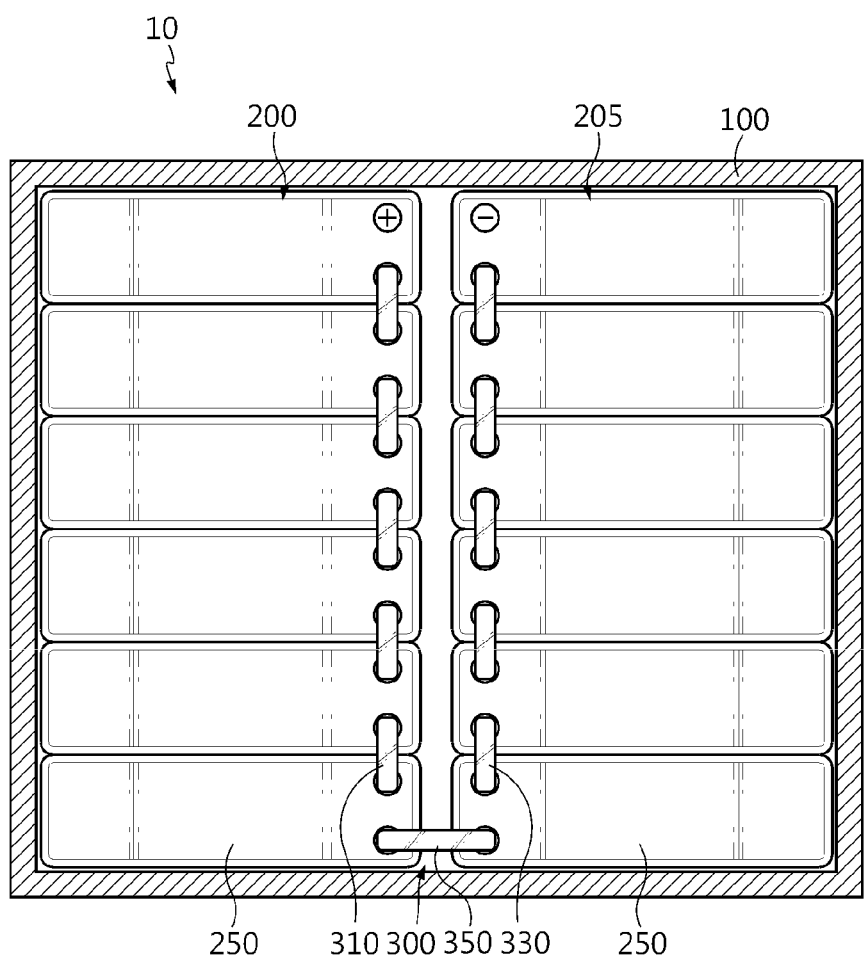
Figure 8:
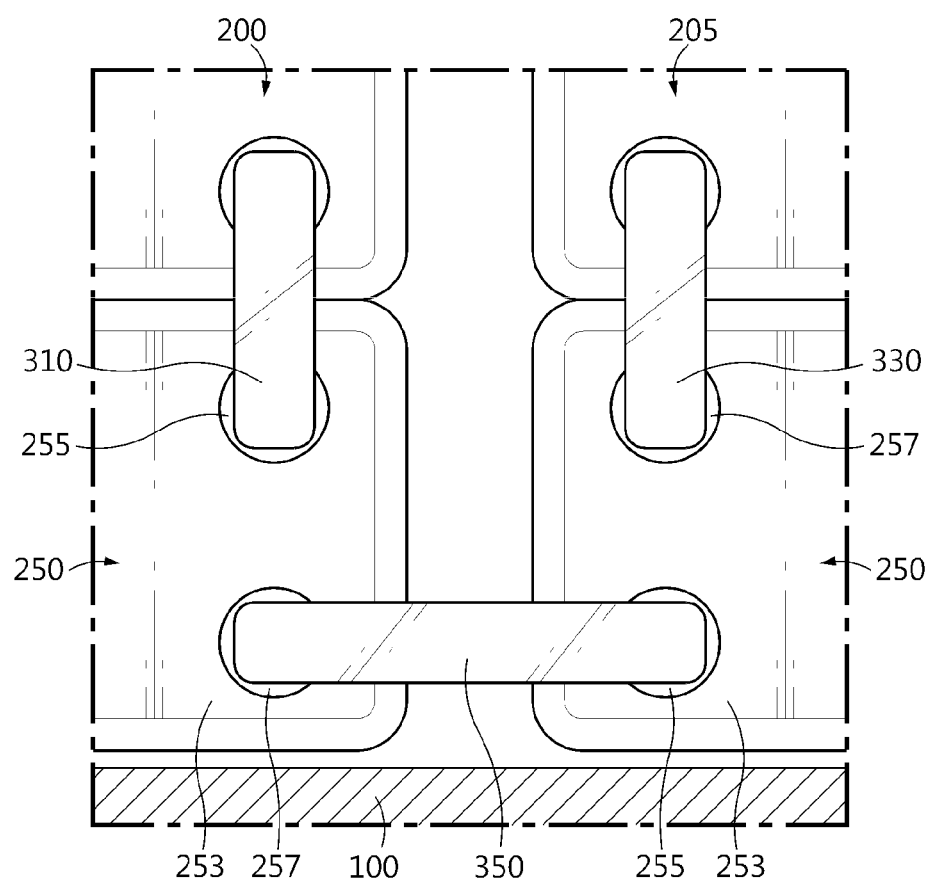

Referring to FIGS. 7 and 8, if the first battery module assembly 200 and the second battery module assembly 205 are completely stacked, the manufacturer or the like may electrically connect the first battery module assembly 200 and the second battery module assembly 205 by means of the bus bar unit 300.

Specifically, the vertically stacked battery modules 250 of the first battery module assembly 200 may be electrically connected to each other through the plurality of first bus bar members 310, and the vertically stacked battery modules 250 of the second battery module assembly 205 may be electrically connected to each other through the plurality of second bus bar members 330.

In addition, through the connection bus bar member 350, the first battery module assembly 200 and the second battery module assembly 205 may be connected to each other. Specifically, the connection bus bar member 350 may connect the negative electrode terminal 257 of the battery module 250 at the bottom end of the first battery module assembly 200 and the positive electrode terminal 255 of the battery module 250 at the bottom end of the second battery module assembly 205 to each other, in the horizontal direction of the rack case 100.

In this embodiment, as the battery modules 250 of the first battery module assembly 200 and the battery modules 250 of the second battery module assembly 205 are arranged in opposite directions, the negative electrode terminal 257 of the battery module 250 at the bottom end of the first battery module assembly 200 and the positive electrode terminal 255 of the battery module 250 at the bottom end of the second battery module assembly 205 may be disposed to face each other with the shortest distance.

Accordingly, in this embodiment, the connection bus bar member 350 may have a predetermined straight bar shape, like the first bus bar member 310 and the second bus bar member 330. Through the connection bus bar member 350, the first battery module assembly 200 and the second battery module assembly 205 may be connected more conveniently.

That is, in this embodiment, when implementing the two-row vertical stacking structure of the first battery module assembly 200 and the second battery module assembly 205, since the battery modules 250 of the first battery module assembly 200 and the battery modules 250 of the second battery module assembly 205 are arranged such that their upper and lower portions are inverted, the distance between the terminals 255, 257 for electrical connection may be realized to be shortest. Accordingly, it is possible to simplify the structure and connection form of the bus bar unit 300 that connects the terminals. That is, the terminals may be conveniently connected through the connection bus bar member 350 having a simple straight bar shape, without extending the connection bus bar member 350 diagonally with a too long length or having a multi-stage bent structure as in the prior art.

Therefore, in this embodiment, when implementing the two-row vertical stacking structure of the first battery module assembly 200 and the second battery module assembly 205, the terminal connection efficiency of the battery modules 250, namely the wiring efficiency, may be remarkably increased.

Accordingly, in this embodiment, the overall electrical connection form of the battery modules 250 may be remarkably simplified, and space utilization inside the rack case 100 may be improved.

In addition, in this embodiment, the shape of the bus bar unit 300 may also be simplified and unified uniformly, so it is possible to reduce the manufacturing cost of the bus bar unit 300 and significantly shorten the assembly process time for the bus bar unit 300.

Figure 9:
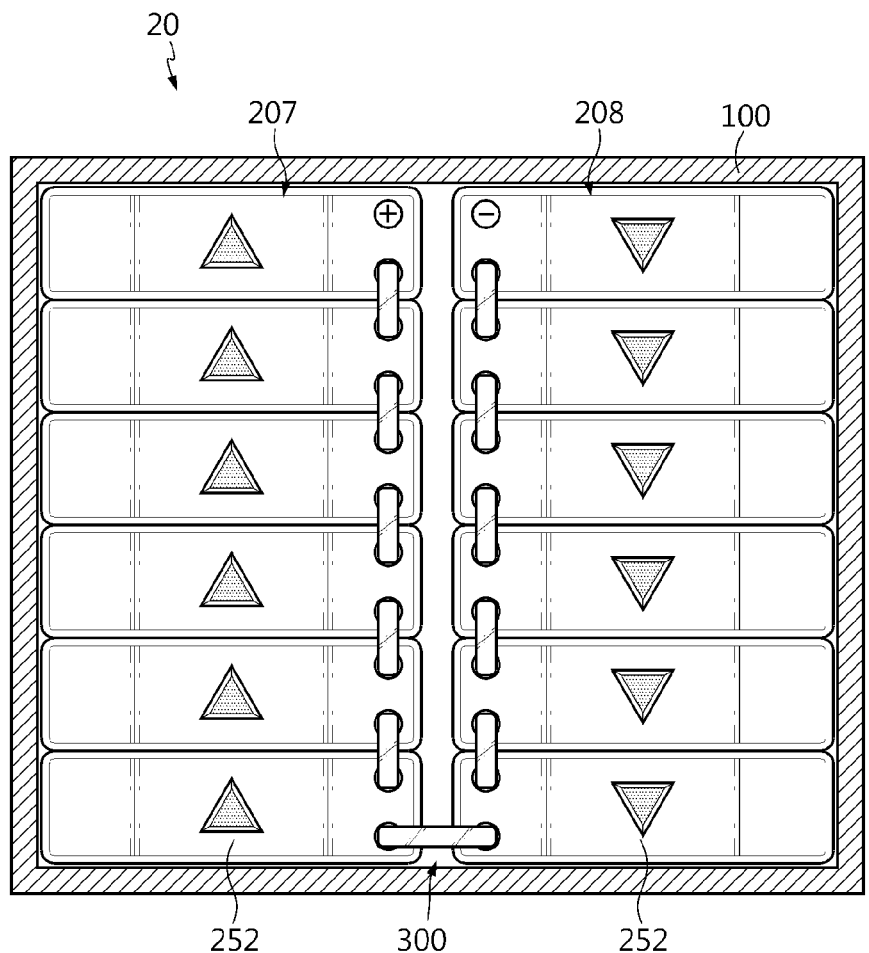
FIGS. 9 and 10 are diagrams for illustrating a battery rack according to another embodiment of the present disclosure.
Figure 10:
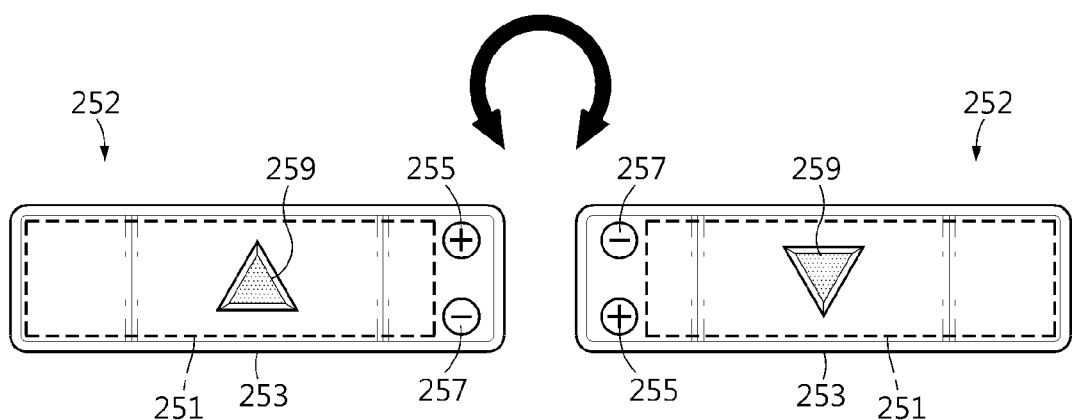

FIGS. 9 and 10 are diagrams for illustrating a battery rack according to another embodiment of the present disclosure.

Since a battery rack 20 according to this embodiment is similar to the battery rack 10 of the former embodiment, hereinafter, features substantially identical or similar to the former embodiment will not be described again, and features different from the former embodiment will be described in detail.

Referring to FIGS. 9 and 10, the battery rack 20 may include a rack case 100, a first battery module assembly 207, a second battery module assembly 205, and a bus bar unit 300.

The rack case 100 is substantially identical or similar to the former embodiment, and thus will not be described again.

Each of the first battery module assembly 207 and the second battery module assembly 208 may include a plurality of battery modules 252.

Each of the plurality of battery modules 252 may include a battery cell 251, a module case 253, a positive electrode terminal 255, a negative electrode terminal 257, and an identifying member 259.

The battery cell 251, the module case 253, the positive electrode terminal 255 and the negative electrode terminal 257 are substantially identical or similar to the former embodiment, and thus will not be described again.

The identifying member 259 is provided to the module case 253 and allows to determine whether the arrangement state of the battery module 252 is a forward direction or a rearward direction based on the upper and lower direction of the rack case 100.

Specifically, the identifying member 259 is provided at a front center of the module case 253 and may be provided in an approximately triangular shape. The identifying member 259 may be arranged in an equilateral triangle shape in the forward direction and in an inverted triangle shape in the rearward direction.

Accordingly, the identifying member 259 may be disposed in an equilateral triangle shape in the plurality of battery modules 252 of the first battery module assembly 207, and the identifying member 259 may be disposed in an inverted triangle shape in the plurality of battery modules 252 of the second battery module assembly 208.

Accordingly, the manufacturer or the like may more conveniently distinguish whether the arrangement state of the battery modules 252 is the forward direction or the rearward direction by recognizing the identifying member 259, and thus it is possible to effectively prevent the risk of mis-assembly during electrical connection through the bus bar unit 300, explained later.

The bus bar unit 300 may include a first bus bar member 310, a second bus bar member 330, and a connection bus bar member 350.

The first bus bar member 310, the second bus bar member 330 and the connection bus bar member 350 are substantially identical or similar to the former embodiment, and thus will not be described again.

As described above, in the battery rack 20 according to this embodiment, the risk of assembly failure caused by incorrect assembly may be significantly reduced by means of the identifying member 259 during the assembly process for the battery rack 10.

Figure 11:
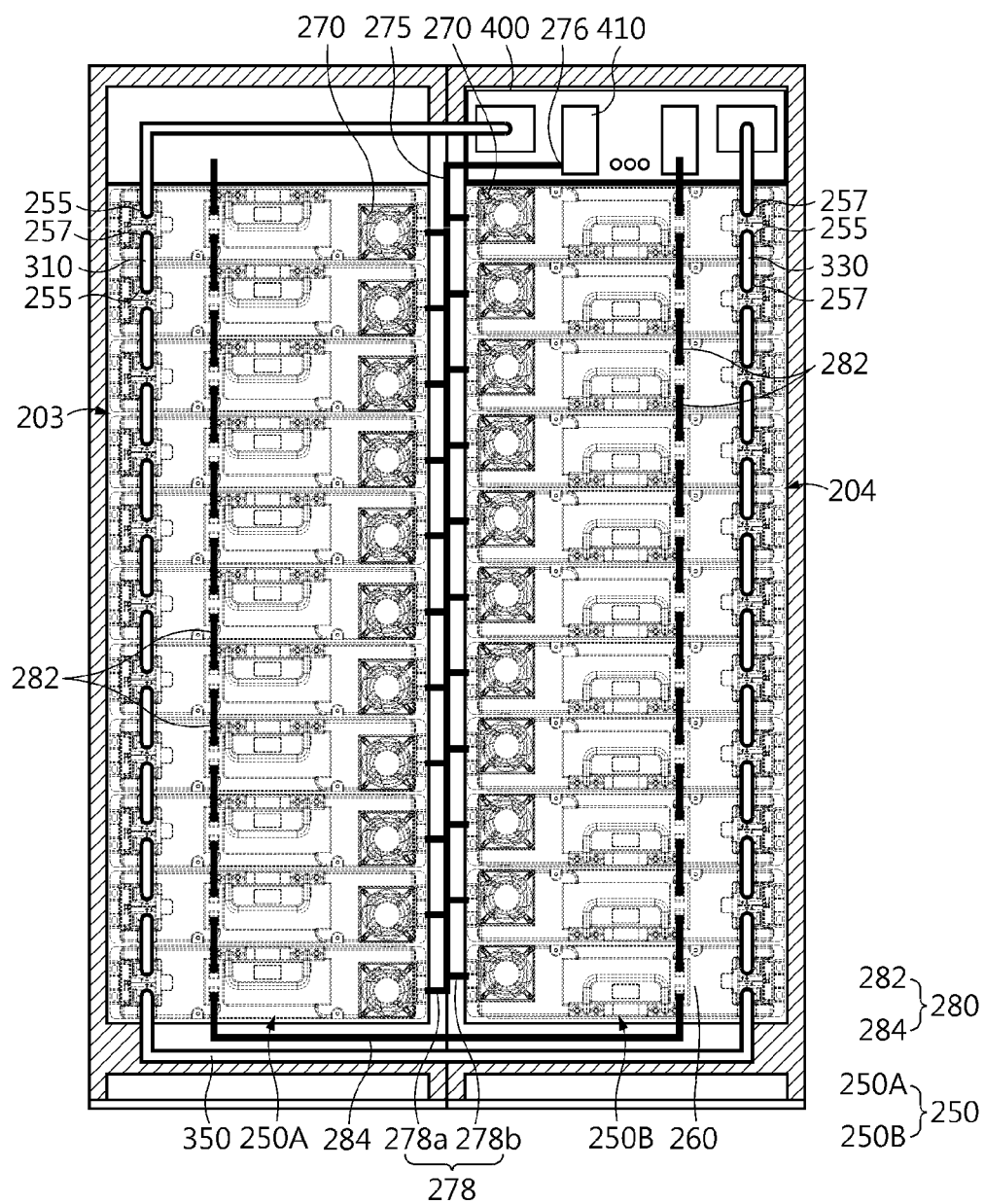
FIG. 11 is a front view for illustrating the battery rack according to another embodiment of the present disclosure.

FIG. 11 is a front view for illustrating the battery rack according to another embodiment of the present disclosure.

Referring to FIG. 11, in a battery rack 10A according to another embodiment, the positive electrode terminal 255 and the negative electrode terminal 257 of the battery module 250 provided in each of the first battery module assembly 203 and the second battery module assembly 204 are arranged at different positions, compared with the battery rack 10 shown in FIG. 7.

Specifically, in a plurality of battery modules 250A provided to the first battery module assembly 203, the positive electrode terminal 255 and the negative electrode terminal 257 may be biased to the left based on the center of the module. In addition, in a plurality of battery modules 250B provided to the second battery module assembly 204, the positive electrode terminal 255 and the negative electrode terminal 257 may be biased to the right based on the center of the module.

In addition, the plurality of battery modules 250B provided to the second battery module assembly 204 may have the same configuration as the plurality of battery modules 250A provided to the first battery module assembly 203, except that the plurality of battery modules 250B are arranged to be inverted in the upper and lower direction. In other words, the components included the plurality of battery modules 250B provided to the second battery module assembly 204 and the components included the plurality of battery modules 250A provided to the first battery module assembly 203 are symmetrically arranged in the left and right direction based on the center between the first battery module assembly 203 and the second battery module assembly 204.

Further, the first battery module assembly 203 may include a plurality of first bus bar members 310 elongated in the upper and lower direction along the stacking direction of the plurality of battery modules 250A. That is, the first bus bar member 310 may be configured to connect the negative electrode terminal 257 of one battery module 250A to the positive electrode terminal 255 of another battery module 250A.

The second battery module assembly 204 may include a plurality of second bus bar members 330 elongated in the upper and lower direction along the stacking direction of the plurality of battery modules 250B. That is, the second bus bar member 330 may be configured to connect the positive electrode terminal 255 of one battery module 250B to the negative electrode terminal 257 of another battery module 250B.

The battery rack 10A may include a connection bus bar member 350 configured to connect the positive electrode terminal 255 of the battery module 250B of the second battery module assembly 204 and the negative electrode terminal 257 of the battery module 250A of the first battery module assembly 203.

Meanwhile, referring to FIG. 11 again, each of the plurality of battery modules 250 may include at least two cell assemblies (not shown), and a battery management system 260.

The cell assembly may include a plurality of battery cells. Here, the cell assembly is described above, and thus will not be described in detail again.

The battery management system 260 may be configured to control charging and discharging of the plurality of battery cells. The battery management system 260 may include electronic components (not shown). For example, the electronic components may be a relay, a current sensor, a temperature sensor, a fuse, and the like. These electronic components may be components for managing charging and discharging of battery cells and securing safety.

In addition, the battery rack 10A may further include a central control unit 400. Specifically, the central control unit 400 may be configured to receive state information of the battery module 250 from the battery management system 260 provided to each of the plurality of battery modules 250 and control charging and discharging of the plurality of battery modules 250. For example, the central control unit 400 may include a communication part (not shown) for sending and receiving a communication signal, an analyzing part (not shown) for analyzing the communication signal, a supplying part 410 for supplying power to an external device or an internal part, and a memory part (not shown) for storing analysis contents of the communication signal.

Moreover, the battery rack 10A may further include a cooling fan 270 and a fan power cable 275.

The cooling fan 270 may be provided to each of the battery modules 250A, 250B. The cooling fan 270 may be configured to put an external air into the battery module 250. Here, the cooling fan 270 may be a known cooling fan 270 that is commonly applied to a battery module. That is, the cooling fan 270 may include an electric motor and a blowing fan.

In addition, the fan power cable 275 may include a wire (where a metal wire is embedded) configured to supply power to operate the cooling fan 270, and an electrically insulating tube covering the wire.

Further, the fan power cable 275 may include a power source 276 and a connector unit 278.

Specifically, the power source 276 may be electrically connected to the supplying part 410 of the central control unit 400 to supply power to the cooling fan 270. For example, as shown in FIG. 11, the fan power cable 275 may have a power source 276 provided at a distal end thereof and electrically connected to the supplying part 410 of the central control unit 400.

The connector unit 278 may be connected to an external power terminal of the cooling fan 270 provided to each of the first battery module assembly 203 and the second battery module assembly 204. For example, the connector unit 278 may be configured to branch in left and right directions toward the plurality of battery modules 250 provided to each of the first battery module assembly 203 and the second battery module assembly 204. In addition, the connector unit 278 may be configured to extend in the upper and lower direction between the first battery module assembly 203 and the second battery module assembly 204.

In addition, the connector unit 278 of the fan power cable 275 may include a first connector portion 278a and a second connector portion 278b.

The first connector portion 278a may have a structure branching to each of the plurality of battery modules 250 of the first battery module assembly 203.

The second connector portion 278b may have a structure spaced apart from the first connector portion 278a in the upper and lower direction and branching to each of the plurality of battery modules 250 of the second battery module assembly 204.

Therefore, according to this configuration of the present disclosure, since the fan power cable 275 includes a power source 276 electrically connected to the central control unit 400 to supply power to the cooling fan 270 and a connector unit 278 branching in left and right directions toward the plurality of battery modules 250 provided to each of the first battery module assembly 203 and the second battery module assembly 204 and connected to the external power terminal of the cooling fan 270, the cooling fan 270 provided to each of the first battery module assembly 203 and the second battery module assembly 204 may be more easily connected to the central control unit 400 by means of the fan power cable 275 configured as above.

That is, in this embodiment, when implementing the two-row vertical stacking structure of the first battery module assembly 203 and the second battery module assembly 204, the battery modules 250A of the first battery module assembly 203 and the battery modules 250B of the second battery module assembly 204 are arranged such that their configurations are disposed oppositely in the left and right directions, and thus the connection distance of the fan power cable 275 for electrically connecting the provided cooling fans 270 may be realized in the shortest distance.

Accordingly, by simplifying the connection structure of the fan power cable 275, it is possible to reduce the manufacturing cost and installation time of components. In other words, the present disclosure may eliminate the inevitable disadvantages of the prior art where two fan power cables are respectively used for battery module assemblies vertically stacked in two rows since the distance is too to connect the fan power cables in parallel connection to supply power to the cooling fans of the battery module assemblies vertically stacked in two rows.

Meanwhile, referring to FIG. 11 again, the battery rack 10A may further include a communication cable 280. The communication cable 280 may be configured to transmit and receive a communication signal between the central control unit 400 and the battery management system 260 provided to each of the plurality of battery modules 250. For example, the communication cable 280 may be configured to transmit information such as temperature, current and voltage of the battery module 250.

The communication cable 280 may use a known communication cable commonly applied to a battery rack. Accordingly, the communication cable 280 will not be described in detail here.

The communication cable 280 may include a connection portion 282 and an extension portion 284.

The connection portion 282 may extend along the plurality of stacked battery modules 250 of the first battery module assembly 203 or the second battery module assembly 204. The connection portion 282 may be connected to the battery management system 260 provided to each of the plurality of battery modules 250.

The extension portion 284 may extend to connect the battery management systems 260 provided to the first battery module assembly 203 and the second battery module assembly 204 with each other.

For example, the extension portion 284 may have a structure extending from the battery module 250A at the bottom end of the first battery module assembly 203 to the battery module 250B at the bottom end of the second battery module assembly 204.

Therefore, according to this configuration of the present disclosure, since the extension portion 284 of the communication cable 280 extends to be connected from the battery module 250A at the bottom end of the first battery module assembly 203 to the battery module 250B at the bottom end of the second battery module assembly 204, it is possible to more conveniently connect the central control unit 400 to the battery management system 260 provided to each of the first battery module assembly 203 and the second battery module assembly 204 through the communication cable 280 configured as above.

That is, in this embodiment, when implementing the two-row vertical stacking structure of the first battery module assembly 203 and the second battery module assembly 204, the battery modules 250A of the first battery module assembly 203 and the battery modules 250B of the second battery module assembly 204 are arranged such that their configurations are disposed oppositely in the left and right directions, and thus the connection distance of the communication cable 280 for communication between the central control unit 400 and the battery management system 260 may be realized in the shortest distance.

Accordingly, by simplifying the connection structure of the communication cable 280, it is possible to reduce the manufacturing cost and installation time of components. That is, in the prior art, in order to connect the communication cables of battery module assemblies vertically stacked in two rows, it is inevitable to connect the battery module at the bottom end of the battery module assembly disposed at the right to the battery module at the top of the battery module assembly disposed at the left. For this reason, the length of the communication cable increases greatly, which increases the material cost and causes inconvenience to the user after the battery rack is installed.

Therefore, the present disclosure effectively solves the problem of the prior art by minimizing the connection length of the communication cable 280.

Figure 12:
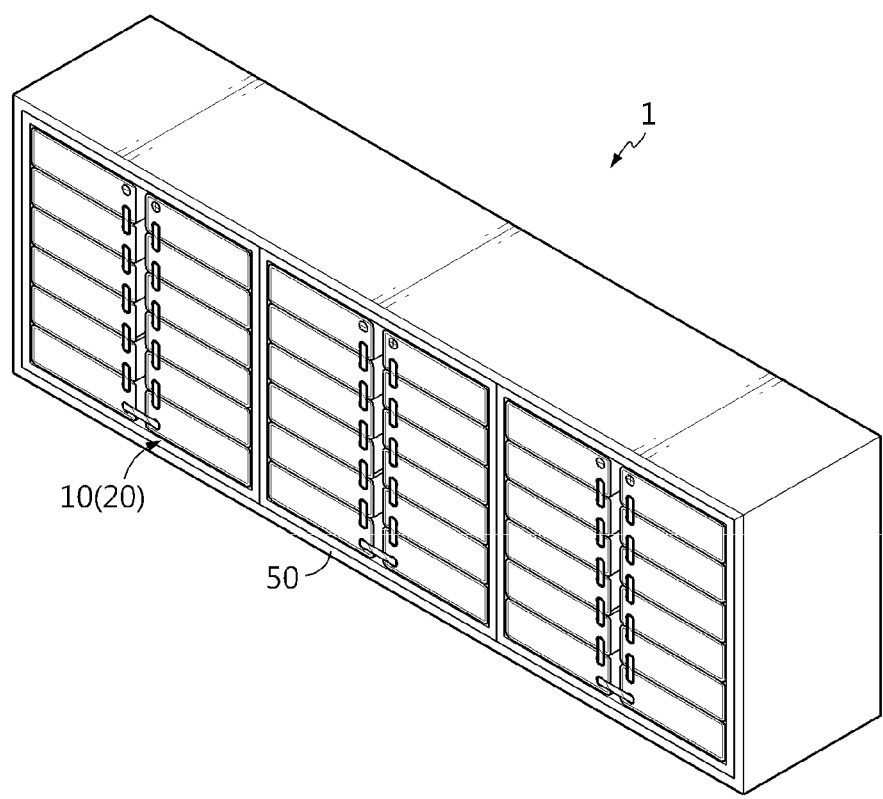
FIG. 12 is a diagram for illustrating an energy storage system according to an embodiment of the present disclosure.

FIG. 12 is a diagram for illustrating an energy storage system according to an embodiment of the present disclosure.

Referring to FIG. 12, an energy storage system 1 is an energy source and may be used for home or industrial use. The energy storage system 1 may include at least one battery rack 10, 20 of the former embodiment, or a plurality of battery racks 10, 20 in this embodiment, and a rack container 50 for accommodating the plurality of battery racks 10, 20.

Since the energy storage system 1 according to this embodiment includes the battery rack 10, 20 of the former embodiment, it is possible to provide an energy storage system 1 that includes all the advantages of the battery rack 10, 20 of the former embodiment.

Moreover, the battery rack 10, 20 of the former embodiment may also be provided to vehicles such as electric vehicles, or other facilities such as other devices or appliances having a secondary battery as an energy source, in addition to the energy storage system 1.

According to various embodiments as described above, it is possible to provide a battery rack 10, 20 capable of efficiently connecting terminals of battery modules 250, 252, and an energy storage system 1 including the battery rack 10, 20.

In addition, according to various embodiments as described above, it is possible to provide a battery rack 10, 20 capable of reducing manufacturing costs and improving assembly process efficiency, and an energy storage system 1 including the battery rack 10, 20.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 1: energy storage system | 10: battery rack |
| 20: battery rack | 50: rack container |
| 100: rack case | |
| 200, 203, 207: first battery module assembly | |
| 204, 205, 208: second battery module assembly | |
| 250, 252: battery module | 251: battery cell |
| 253: module case | 255: positive electrode terminal |
| 257: negative electrode terminal | 259: identifying member |
| 300: bus bar unit | 310: first bus bar member |
| 330: second bus bar member | 350: connection bus bar member |
| 260: battery management system | 400: central control unit |
| 270: cooling fan | |
| 275: fan power cable | 276, 278: power source, connector unit |
| 280: communication cable | 282, 284: connection portion, extension portion |

INDUSTRIAL APPLICABILITY

The present disclosure relates to a battery rack. In addition, the present disclosure may be used in industries related to a large-scale energy storage system including the battery rack.

What is claimed is:
1. A battery rack, comprising:
a rack case having a predetermined accommodation space;
a plurality of battery modules including a first plurality of battery modules and a second plurality of battery modules, each of the plurality of battery modules having a positive electrode terminal and a negative electrode terminal on a first end of the battery modules, the first end facing a first direction;
a first battery module assembly disposed inside the rack case and including the first plurality of battery modules stacked along an upper and lower direction of the rack case, the positive electrode terminal being above the negative electrode terminal; and
a second battery module assembly disposed to be spaced apart from the first battery module assembly by a predetermined distance and including the second plurality of battery modules stacked along the upper and lower direction of the rack case,
wherein, inside the rack case, the second plurality of battery modules of the second battery module assembly are inverted based on the arrangement of the first plurality of battery modules of the first battery module assembly to have the negative electrode terminal being above the positive electrode terminal, and
wherein each of the plurality of battery modules further includes an identifying member provided to a module case and spaced from the negative electrode terminal and positive electrode terminal and configured to indicate an orientation of each of the plurality of battery modules,
wherein the identifying member has a first orientation and a second orientation which is inverted to the first orientation,
wherein the identifying member has a different visual appearance in the first orientation and the second orientation, and
wherein the identifying member of each of the first plurality of battery modules is in the first orientation and the identifying member of each of the second plurality of battery modules is in the second orientation.

2. The battery rack according to claim 1, further comprising:
a bus bar configured to electrically connect the first plurality of battery modules of the first battery module assembly and the second plurality of battery modules of the second battery module assembly.

3. The battery rack according to claim 2, wherein each component of the bus bar is provided to have a straight bar shape.

4. The battery rack according to claim 2, wherein the bus bar includes:
a plurality of first bus bar members configured to connect the first plurality of battery modules of the first battery module assembly to each other;
a plurality of second bus bar members configured to connect the second plurality of battery modules of the second battery module assembly to each other; and
a connection bus bar member configured to connect the first battery module assembly and the second battery module assembly to each other.

5. The battery rack according to claim 4, wherein the connection bus bar member is configured to connect a battery module at a bottom end of the first battery module assembly and a battery module at a bottom end of the second battery module assembly to each other.

6. The battery rack according to claim 5, wherein the connection bus bar member is provided to have a straight bar shape and configured to connect the battery module at the bottom end of the first battery module assembly and the battery module at the bottom end of the second battery module assembly to each other in a horizontal direction of the rack case.

7. The battery rack according to claim 2, wherein each of the plurality of battery modules includes:
at least one battery cell; and
a module case configured to accommodate the at least one battery cell,
wherein the positive electrode terminal and the negative electrode terminal are provided at one side of the module case and electrically connected to the at least one battery cell.

8. The battery rack according to claim 7, wherein the positive electrode terminal and the negative electrode terminal of each of the plurality of battery modules are arranged in an upper and lower direction at one end of the module case.

9. The battery rack according to claim 7, wherein each of the plurality of battery modules further includes at least two cell assemblies having a plurality of battery cells; and
a battery management system configured to control charging and discharging of the plurality of battery cells; and
a central controller configured to receive state information of the plurality of battery modules from the battery management system provided to each of the plurality of battery modules and control charging and discharging of the plurality of battery modules.

10. The battery rack according to claim 9, further comprising:
a cooling fan provided to each of the plurality of battery modules and configured to put an external air into each of the plurality of battery modules; and
a fan power cable configured to supply power to operate the cooling fan.

11. The battery rack according to claim 10, wherein the fan power cable includes:
a power source electrically connected to the central controller to supply power to the cooling fan; and
a connector configured to branch in left and right directions toward each of the plurality of battery modules and connected to an external power terminal of the cooling fan.

12. The battery rack according to claim 11, wherein the connector of the fan power cable includes:
a first connector portion configured to branch to each of the first plurality of battery modules of the first battery module assembly; and
a second connector portion configured to branch to each of the second plurality of battery modules of the second battery module assembly.

13. The battery rack according to claim 9, further comprising:
a communication cable configured to provide and receive a communication signal between the central controller and the battery management system provided to each of the plurality of battery modules,
wherein the communication cable includes:
a connection portion configured to extend along the first plurality of battery modules of the first battery module assembly or the second plurality of battery modules of the second battery module assembly and connected to the battery management system provided to each of the plurality of battery modules; and
an extension portion configured to extend to connect the battery management systems respectively provided to the first battery module assembly and the second battery module assembly to each other,
wherein the extension portion is configured to extend from a battery module at a bottom end of the first battery module assembly to a battery module at a bottom end of the second battery module assembly.

14. An energy storage system, comprising at least one battery rack according to claim 1.

15. The battery rack according to claim 1, further comprising a cooling fan and a communication cable on the first side of each of the plurality of battery modules.

16. The battery rack according to claim 1, wherein a side of the rack case facing the first end of the plurality of battery modules is open.

* * * * *